United States Patent
Toyoshima et al.

(10) Patent No.: US 8,166,252 B2
(45) Date of Patent: Apr. 24, 2012

(54) PROCESSOR AND PREFETCH SUPPORT PROGRAM

(75) Inventors: Takashi Toyoshima, Kawasaki (JP); Takashi Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 341 days.

(21) Appl. No.: 12/622,817

(22) Filed: Nov. 20, 2009

(65) Prior Publication Data

US 2010/0070716 A1 Mar. 18, 2010

Related U.S. Application Data

(63) Continuation of application No. PCT/JP2007/062256, filed on Jun. 18, 2007.

(51) Int. Cl.
*G06F 12/00* (2006.01)
(52) U.S. Cl. ....................................... 711/137
(58) Field of Classification Search ................. None
See application file for complete search history.

(56) References Cited

U.S. PATENT DOCUMENTS

| | | | |
|---|---|---|---|
| 5,652,858 A | 7/1997 | Okada et al. | |
| 5,721,865 A * | 2/1998 | Shintani et al. | 711/137 |
| 2007/0288697 A1* | 12/2007 | Keltcher | 711/137 |

FOREIGN PATENT DOCUMENTS

| | | |
|---|---|---|
| JP | 06-051982 | 2/1994 |
| JP | A 7-56809 | 3/1995 |
| JP | A 8-55025 | 2/1996 |
| JP | A 11-143774 | 5/1999 |

OTHER PUBLICATIONS

Japanese Office Action issued Aug. 3, 2010, in Japanese Application No. 2009-520166 (first page only).
Wei-Fen Lin, et al., "Designing a Modern Memory Hierarchy with Hardware Prefetching," IEEE Transactions on Computers, vol. 50, No. 11, Nov. 2001, p. 1202-1218.
Steven P. Vanderwiel, "Data Prefetch Mechanisms," ACM Computing Surveys, vol. 32, No. 2, Jun. 2000, pp. 174-199.
Todd C. Mowry, et al., "Design and Evaluation of a Compiler Algorithm for Prefetching," Computer Systems Laboratory, ,ACM SIGPLAN Notices, vol. 27, No. 9, Sep. 1992, pp. 1-12.
David Callahan, et al., "Software Prefetching," ACM SIGARCH Computer Architecture News, vol. 19, Apr. 1991, pp. 40-52.
Tien-Fu Chen, et al., "A Performance Study of Software and Hardware Data Prefetching Schemes," Proc. 1994, the 21$^{st}$ Annual International Symposium on Comuter Architecture, 1994, pp. 223-232.

* cited by examiner

*Primary Examiner* — Hiep Nguyen
(74) *Attorney, Agent, or Firm* — Greer, Burns & Crain, Ltd.

(57) ABSTRACT

A processor loads a program from a main memory, detects a register updating instruction, and registers the address of the register updating instruction in a register-producer table storing unit. Moreover, the processor loads the program to detect a memory access instruction, compares a register number utilized by the detected memory access instruction with a register-producer table to specify an address generation instruction, and rewrites an instruction corresponding to the address generation instruction.

8 Claims, 16 Drawing Sheets

FIG.1

SAMPLE PROGRAM

```
0x00004020 : move    r1 = r2
0x00004024 : add     r2 = r2 + r3
0x00004028 : move    r3 = r2
       .
       .
       .
0x000040a0 : load    r4 = [r1]
```

FIG.2

REGISTER-PRODUCER TABLE

| REGISTER NUMBER | ADDRESS OF REGISTER UPDATING INSTRUCTION |
|---|---|
| 1 | 0x00004020 |
| 2 | 0x00004024 |
| 3 | 0x00004028 |
| 4 | 0x000040a0 |

⋮

| N | 0x00004010 |

FIG.9

| TAG | STATE | ADDRESS GENERATION FLAG (ONE LINE) | | | INSTRUCTION WORD (ONE LINE) | | | CACHE INFORMATION |
|---|---|---|---|---|---|---|---|---|
| 0x39d8 | INVALID | FALSE | FALSE | FALSE | 0x13af637d | 0x8fdc6a3e | 0xfd36729b | ⋯ |
| 0x7ef1 | CLEAN | FALSE | FALSE | FALSE | 0x836fd92c | 0x184fdb3e | 0xfd7e39ac | ⋯ |
| 0x0dae | DIRTY | FALSE | FALSE | FALSE | 0x856fd92e | 0x244f2bfe | 0xa3be8c22 | ⋯ |
| 0x4f99 | CLEAN | FALSE | TRUE | FALSE | 0x84e7abc3 | 0x256f2b22 | 0xfd8467e | ⋯ |
| ⋯ | ⋯ | ⋯ | ⋯ | ⋯ | ⋯ | ⋯ | ⋯ | ⋯ |

PROCESSOR AND PREFETCH SUPPORT PROGRAM

CROSS-REFERENCE TO RELATED APPLICATION

This application is a continuation of International Application No. PCT/JP2007/062256, filed on Jun. 18, 2007, the entire contents of which are incorporated herein by reference.

FIELD

The embodiments discussed herein are directed to a processor and the like having a prefetch function for previously storing information stored in a memory storage in a cache.

BACKGROUND

Current computer systems introduce a cache system to conceal a speed difference between a memory and a computing unit. A cache memory, hereinafter simply referred to as "cache", indicates a small-capacity and high-speed memory that temporarily stores therein data frequently used. To raise performance of the overall computer system, it is required to effectively utilize the cache.

There are two approaches to make efficient use of the cache. The first approach is that data having a high reuse possibility among data once stored in a cache is not sent outside the cache if possible. The second approach is that data having a high use possibility in the near future is preliminarily transferred from a slow memory to a fast cache. In the latter approach, the representative technique is a technique referred to as prefetch (for example, see Japanese Laid-open Patent Publication No. 07-56809 and Japanese Laid-open Patent Publication No. 11-143774).

A computer system having a cache system includes a small and high-speed memory that is located near a processor, and a large and low-speed memory that is located far from the processor. Data frequently utilized is saved in the memory located near the processor. In this way, all memories can be ideally in the state where all memories seem to be a near and fast memory. The recent computer system realizes an access time close to the ideal state by virtue of all kinds of efforts. The mechanism of such a hierarchical memory is referred to as cache. John L. Hennessy and David A. Patterson, *Computer Architecture—A Quantitative Approach* 3rd Edition MORGAN KAUFMANN PUBLISHERS, ISBN1-55860-724-2 discloses a computer system having a cache system.

Moreover, the details of micro-architecture starting with an out-of-order technology in a super scalar processor are described in Mike Johnson, *Superscalar Microprocessor Design*, Prentice-Hallm Inc, ISBN 0138756341. The out-of-order technology is a technology for dynamically responding to factors such as cache miss that cannot be predicted at the time of compilation while executing instructions within the processor and reconfiguring the instructions in optimum execution order.

Next, a prefetch technology is described. The prefetch technology is one of technologies for optimizing cache access. In general, when an instruction such as a load instruction of loading data from a memory is executed, the data is loaded from a main memory if the data is not present in the cache. This access is an extremely time-consuming process compared with a process of accessing the cache to obtain data on the cache.

When a memory address to be read is preliminarily known, necessary data can be preliminarily loaded from a main memory to a cache. Performing data transfer from a memory to a cache in parallel with normal processes allows high speed data load from the cache when the data is loaded after that. A process of preliminarily transferring data from a main memory to a cache in parallel with other processes in this manner is referred to as prefetch.

In the case of normal memory access, the execution of a memory access instruction is not completed until data can be acquired. On the other hand, the prefetch process is performed in parallel with the execution of another instruction. Therefore, a processor continues to process the next instruction even if data acquisition is not completed. For this reason, by performing prefetch beforehand, data can be transferred to a cache when needed.

If transferring data to a cache is completed before the data becomes actually necessary, the data is loaded from the cache at high speed. When data transferring is not completed, data is loaded after waiting until the transfer of data is completed. In this case, although an effect is small as compared to when prefetch is ready in time, the response of memory load is speeded up as compared to a situation when a prefetch instruction is not utilized because the memory load process is started in advance of the process of an instruction.

The prefetch is further explained in detail. In general, prefetch is largely classified into two kinds of prefetch, i.e., software prefetch and hardware prefetch. The performance comparison between the software prefetch and the hardware prefetch is disclosed in Tien-Fu Chen and Jean-Loup Baer, "A performance study of software and hardware data prefetching schemes", *Proc.* 1994 the 21st Annual International Symposium on Computer Architecture.

To perform software prefetch, a compiler or a programmer explicitly embeds prefetch instructions as described in David Callahan, Ken Kennedy, and Allan Porterfield, "Software prefetching", *ACM SIGARCH Computer Architecture News* Volume 19, Issue 2 (April 1991) and Todd C. Mowry, Monica S. Lam, and Anoop Gupta, "Design and evaluation of a compiler algorithm for prefetching", *ACM SIGPLAN Notices Volume* 27, Issue 9 (September 1992). Based on the static characteristic of a program, the prefetch instruction is embedded into the program at a point ahead of the point at which an actual memory access instruction is present, with respect to a point at which cache miss seems to occur.

In hardware prefetch, a processor implicitly performs prefetch as described in Steven P. Vanderwiel and David J. Lilja, "Data Prefetch mechanisms", *ACM Computing Surveys* Volume 32, Issue 2 (June 2000) and Wei-Fen Lin, Steven K. Reinhardt, and Doug Burger, "Designing a Modern Memory Hierarchy with Hardware Prefetching", *IEEE Transactions on Computers* Volume 50, Issue 11 (November 2001). The hardware prefetch is performed based on the forecast from the dynamic behavior of an application. The processor detects a consecutive stream memory access or a stride memory access performing regular continuous accesses at constant intervals and performs prefetch to perform look-ahead on these accesses.

In the conventional hardware prefetch technology, prefetch is predicted and performed based on a past access tendency only on stream access or stride access to a memory. Therefore, an application having a regular memory access pattern such as scholarly computation has effect. However, there is a problem in that a prediction accuracy of hardware prefetch is low and thus an effect of hardware prefetch is low in a general application (particularly, an application having a irregular memory access pattern).

Therefore, it is important to perceive irregular memory access depicted in a general application and perform effective hardware prefetch.

SUMMARY

According to an aspect of an embodiment of the invention, a processor having a prefetch function for previously storing information of a memory storage in a cache, and includes a storage control unit that stores, when a program stored in the memory storage is loaded to execute an instruction and it is determined that the instruction is an instruction for updating a value of a register, identification information of the register and the instruction in association with each other in a register-producer table; an instruction specifying unit that specifies, when the program stored in the memory storage is loaded to execute an instruction and it is determined that the instruction is an instruction accessing an address indirectly specified by a register, an instruction of updating the register as an address generation instruction based on identification information of the register indirectly specifying the address and the register-producer table; and a prefetch unit that prefetches a value of the register updated by the address generation instruction.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram explaining a mechanism by which a processor specifies an address generation instruction according to a first embodiment;

FIG. 2 is a diagram illustrating an example of a data structure of a register-producer table;

FIG. 9 is a diagram illustrating an example of a data structure of cache information;

DESCRIPTION OF EMBODIMENT

Figure 3:
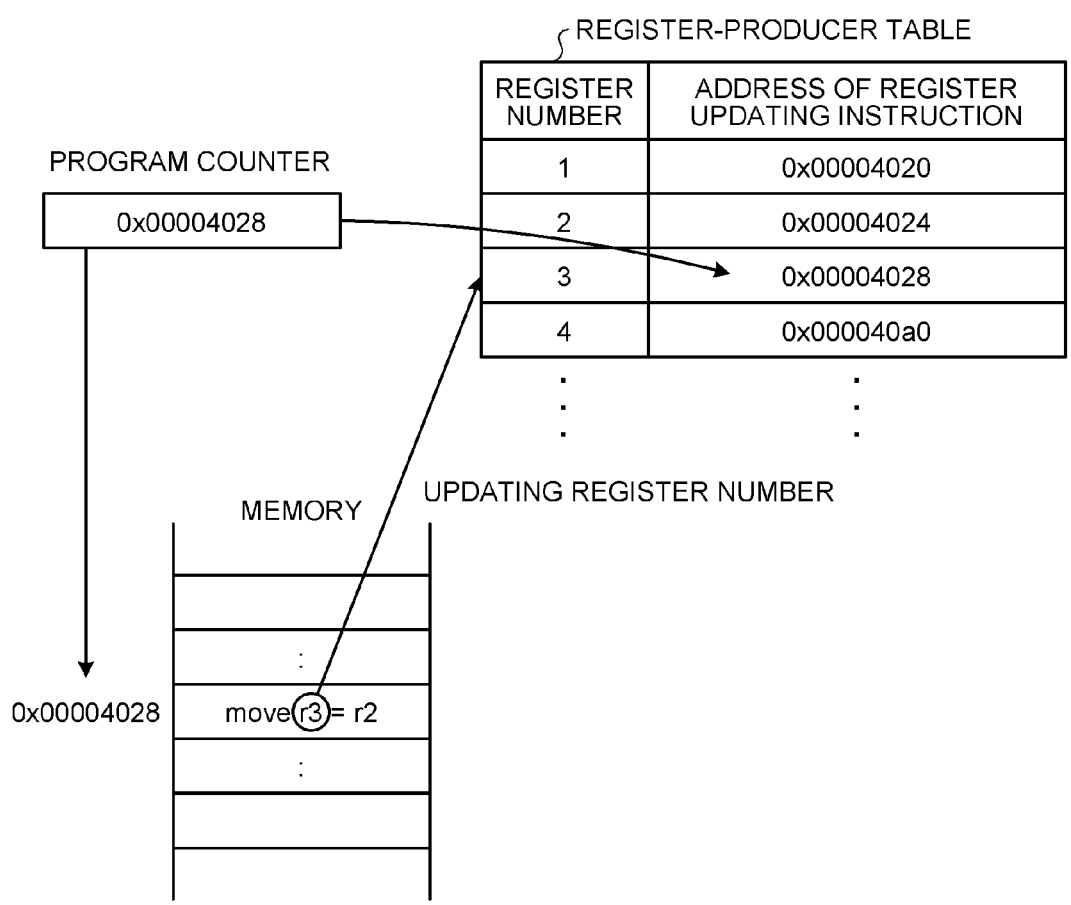
FIG. 3 is a diagram explaining an updating process of the register-producer table.

Embodiments of the present invention will be explained with reference to the accompanying drawings. The present invention is not limited to the embodiments explained below.

[a] First Embodiment

First, a processor according to the first embodiment is explained. The processor according to the first embodiment is a processor having a hardware prefetch (hereinafter, prefetch) function for previously storing data of a main memory in a cache. When a program stored in the main memory (or the cache) is loaded to execute an instruction and it is determined that the instruction is an instruction updating a value of a register (hereinafter, register updating instruction), the processor stores the identification information of the register and the register updating instruction in association with each other in a register-producer table.

When the processor executes a program stored in the main memory (or the cache) and determines that an instruction during execution of the program is an instruction of accessing an address indirectly specified by a register, the processor specifies an instruction of updating the register (the register that indirectly specifies an address) among register updating instructions based on identification information of the register that indirectly specifies an address and the register-producer table, and prefetches the value of the register updated by the specified instruction (address generation instruction).

In this manner, when specifying an address generation instruction by using the register-producer table and executing the following address generation instruction, the processor according to the first embodiment prefetches the value of the register updated by the address generation instruction. Therefore, it is possible to perceive irregular memory access depicted in a general application and perform effective hardware prefetch.

Next, a mechanism by which a processor specifies an address generation instruction according to the first embodiment is explained. FIG. 1 is a diagram explaining a mechanism by which a processor specifies an address generation instruction according to the first embodiment. In FIG. 1, a sample program developed on a main memory is illustrated. Numbers 0x00004020 to 0x000040a0 illustrated in FIG. 1 indicate memory addresses (values of a program counter). The processor sequentially executes instructions from 0x00004020 toward the bottom in the sample program.

Various types of instructions included in the sample program illustrated in FIG. 1 is now explained. An instruction "move" is an instruction of copying data between registers. An expression called "move r1=r2" illustrated in FIG. 1 means assigning the value of a register of No. 2 to a register of No. 1.

An instruction "add" is an addition instruction. An expression called "add r2=r2+r3" means storing a result obtained by adding the value of the register of No. 2 to the value of a register No. 3 in the register of No. 2. An instruction "load" is an instruction of performing memory access (memory access instruction). An expression called "[r1]" means the value of a memory of which the address is the value of the register of No. 1.

Therefore, an expression "load r4=[r1]" illustrated in FIG. 1 means that the value of the register of No. 1 is used as an address and the value read from the area corresponding to the address of the memory is stored in a register of No. 4. The sample program based on the above is explained.

The processor writes the address of a register updating instruction in the corresponding area of the register-producer table (entry) when instructions included in a program are executed and an instruction during execution is an instruction of updating a register (register updating instruction). FIG. 2 is a diagram illustrating an example of a data structure of the register-producer table.

The register-producer table has entries by the number of registers included in the processor and each entry stores the address of a register updating instruction by which a register corresponding to each entry is finally updated. In an example illustrated in FIG. 2, the address of the register updating instruction of the register of No. 1 is "0x00004020". The register-producer table has a state where the addresses of the register updating instructions by which the registers are finally updated are written.

The updating process of the register-producer table is always performed for all instructions. FIG. 3 is a diagram explaining the updating process of the register-producer table. As illustrated in FIG. 3, because the "move" instruction located at the memory address (program counter) "0x00004028" updates the register of No. 3, this instruction becomes a register updating instruction. Therefore, the address "0x00004028" of the "move" instruction is registered in the entry corresponding to the register of No. 3 of the register-producer table.

When the updating process of the register-producer table is explained by using the sample program illustrated in FIG. 1, the first instruction "move" becomes a register updating instruction because the register of No. 1 is updated at the first line of the sample program. Therefore, the address "0x00004020" of the "move" instruction is registered in the entry corresponding to the register of No. 1 of the register-producer table.

Similarly, because the second and third instructions "add" and "move" of the sample program are instructions of updating the registers of No. 2 and No. 3, the instructions become a register updating instruction. The address of each instruction is registered in the entry corresponding to the register number.

Figure 4:
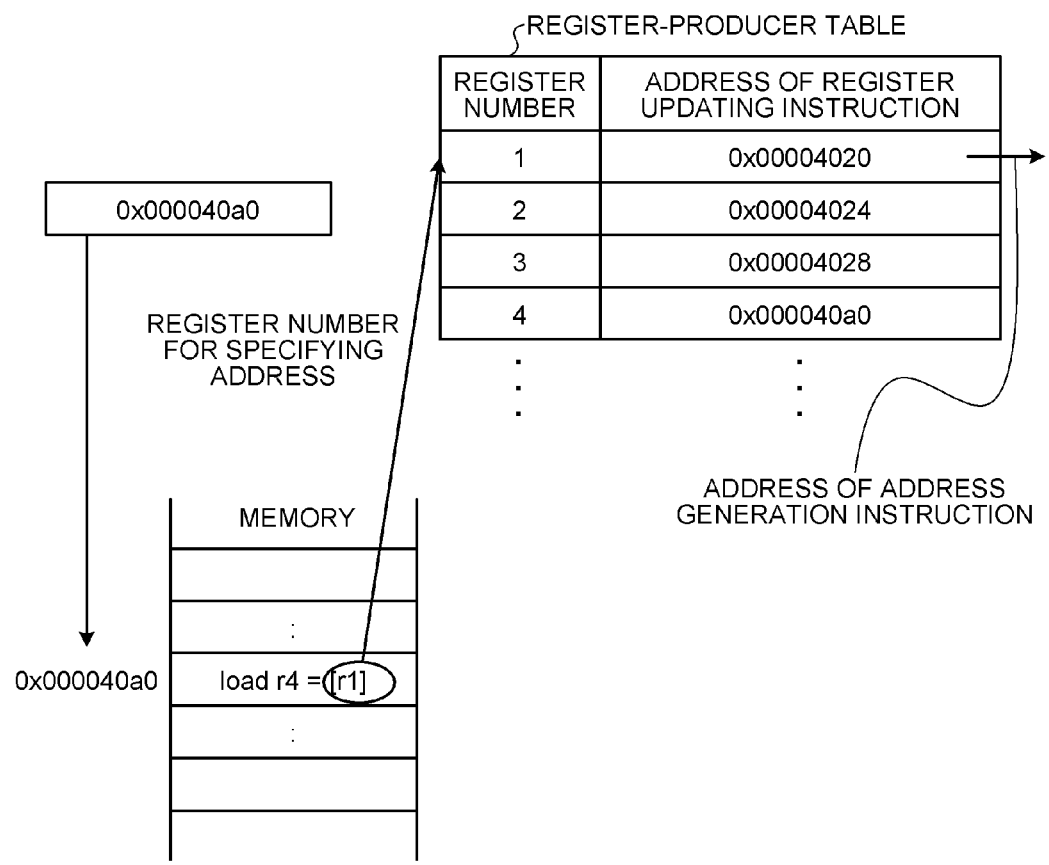
FIG. 4 is a diagram explaining a process specifying the address generation instruction.

Next, a process specifying an address generation instruction is explained. FIG. 4 is a diagram explaining a process specifying an address generation instruction. When the processor specifies an address generation instruction, the processor first detects a memory access instruction from instructions included in a program.

In an example illustrated in FIG. 4, because the "load" instruction of the memory address "0x000040a0" assigns the value of the address stored in the register of No. 1 to the register of No. 4 (accesses the address indirectly specified by the register), the "load" instruction becomes a memory access instruction.

After detecting a memory access instruction, the processor compares a register number (the register No. 1 in an example illustrated in FIG. 4) referred to by the detected memory access instruction with the register-producer table to specify a register updating instruction by which the register of the register number is finally updated, and specifies the specified register updating instruction as an address generation instruction.

A process specifying an address generation instruction by using the sample program illustrated in FIG. 1 will be explained. In the sample program illustrated in FIG. 1, an instruction corresponding to a memory access instruction is the "load" instruction.

The processor detects a memory access instruction and then specifies a register number referred to by the detected memory access instruction. In the sample program illustrated in FIG. 1, a register number referred to by the memory access instruction "load" becomes the register No. 1.

After specifying register number referred to by the memory access instruction, the processor compares the specified register number and the register-producer table (see FIG. 2) to specify a register updating instruction by which the register of the register number is finally updated, and specifies the specified register updating instruction as an address generation instruction. In the sample program illustrated in FIG. 1, the first-line (memory address 0x00004020) "move" instruction becomes an address generation instruction.

Next, an instruction rewriting process performed by the processor according to the first embodiment is explained. In the method of specifying an address generation instruction described above, the "move" instruction can be determined as an address generation instruction only after the "load" instruction is executed. However, to perform prefetch just after the "move" instruction, the "move" instruction has to be determined as an address generation instruction in advance.

Figure 5:
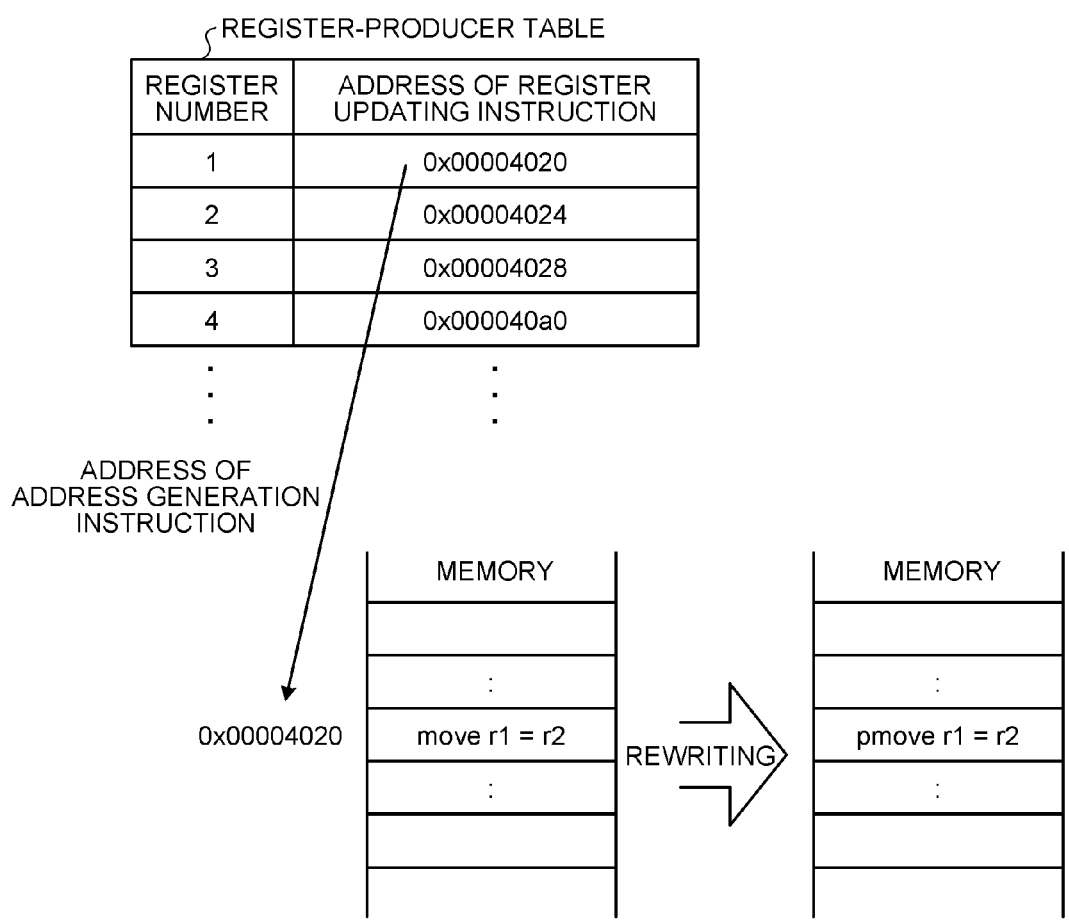
FIG. 5 is a diagram explaining a rewriting process of an instruction.

When specifying an address generation instruction, the processor according to the first embodiment rewrites the instruction into a special instruction of performing prefetch after an operation in addition to the original process. FIG. 5 is a diagram explaining a rewriting process of an instruction.

As illustrated in FIG. 5, for example, as described above, when the address "0x00004020" of the register updating instruction is determined as the address of an address generation instruction after specifying a memory access instruction, the processor accesses the memory address "0x00004020" and rewrites the instruction registered in the address.

In an example illustrated in FIG. 5, the "move" instruction is rewritten into a "pmove" instruction. When the processor fetches the "pmove" instruction, the processor executes a process corresponding to the original "move" instruction and also prefetches the value of the updated register (the value of the register of No. 1 in FIG. 5) in the cache.

In this manner, because the processor according to the embodiment specifies an address generation instruction and rewrites the specified address generation instruction, the processor next fetches the address generation instruction and can then prefetch the value of the register that is updated to the address generation instruction. Therefore, because the processor can utilize the prefetched value when executing a subsequent memory access instruction, the processing efficiency of the processor can be improved.

Figure 6:
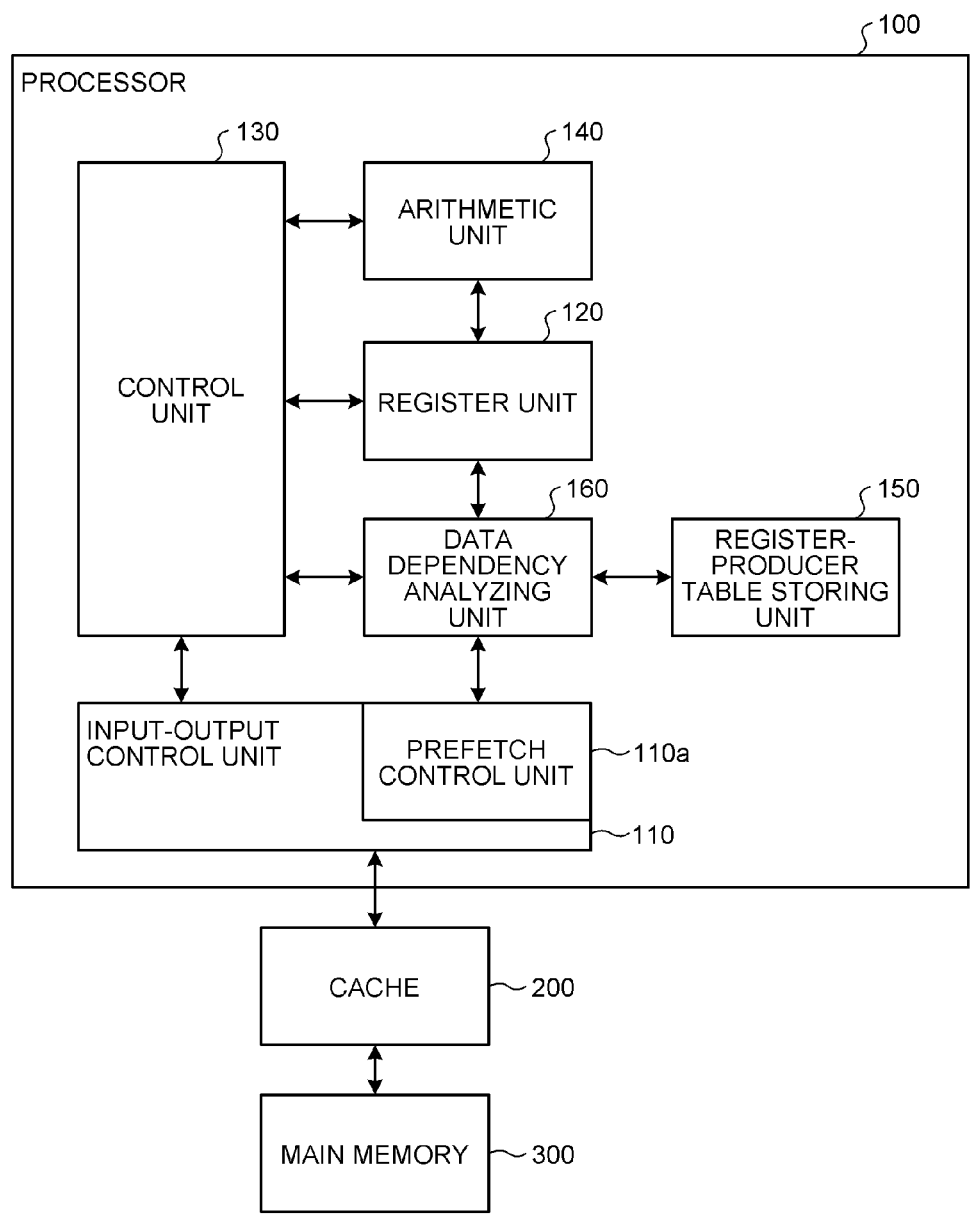
FIG. 6 is a functional block diagram illustrating the configuration of the processor according to the first embodiment.

Next, an example of the configuration of the processor described above is explained. FIG. 6 is a functional block diagram illustrating the configuration of the processor according to the first embodiment. As illustrated in FIG. 6, a processor 100 includes an I/O control unit 110, a register unit 120, a control unit 130, an arithmetic unit 140, a register-producer table storing unit 150, and a data dependency analyzing unit 160.

The processor 100 is connected to a cache 200, and the cache 200 is connected to a main memory 300. The cache 200 and the main memory 300 are a memory storage that stores instructions, data, and the like utilized by the processor 100. In FIG. 6, the one-stage cache 200 is illustrated. However, the cache 200 can have a several-stage configuration.

The I/O control unit 110 is a unit for controlling input and output of data that are executed between the processor 100 and the cache 200. The I/O control unit 110 includes a prefetch control unit 110a. The prefetch control unit 110a is a unit for prefetching data registered in the area of the address when acquiring a memory address of a prefetch target from the data dependency analyzing unit 160.

The control unit 130 is a control unit for fetching an instruction from the cache 200 or the main memory 300, decoding the instruction, and executing various types of processes according to the instruction. The register unit 120 is a storage unit made up of a plurality of registers (general registers, a program counter, and the like) for storing instructions and data that are used in the control unit 130.

The arithmetic unit 140 is a unit for acquiring a control instruction from the control unit 130, executing various types of arithmetic processes, and outputting an operation result to the register unit 120 or the control unit 130. The register-producer table storing unit 150 is a storage unit for storing the register-producer table described in FIG. 2.

The data dependency analyzing unit 160 is a unit for specifying an address generation instruction and rewriting an instruction stored on the main memory 300 corresponding to the specified address generation instruction. The process of the data dependency analyzing unit 160 will be explained. The data dependency analyzing unit 160 loads the program stored in the main memory 300 or the cache 200, specifies a register updating instruction, and registers the address of the specified register updating instruction in the register-producer table.

Moreover, the data dependency analyzing unit 160 analyzes the dependency relation of the program, specifies an address generation instruction by using the above-described technique (see FIG. 4), and rewrites the address generation instruction stored on the main memory 300 to a special instruction (see FIG. 5). Then, when the data dependency analyzing unit 160 detects an instruction acting as an address generation instruction in the course of processing the program, the data dependency analyzing unit 160 outputs a control instruction to the prefetch control unit 110a to prefetch a value of a register to be updated by the address generation instruction (outputs an address of data to be prefetched to the prefetch control unit 110a).

Figure 7:
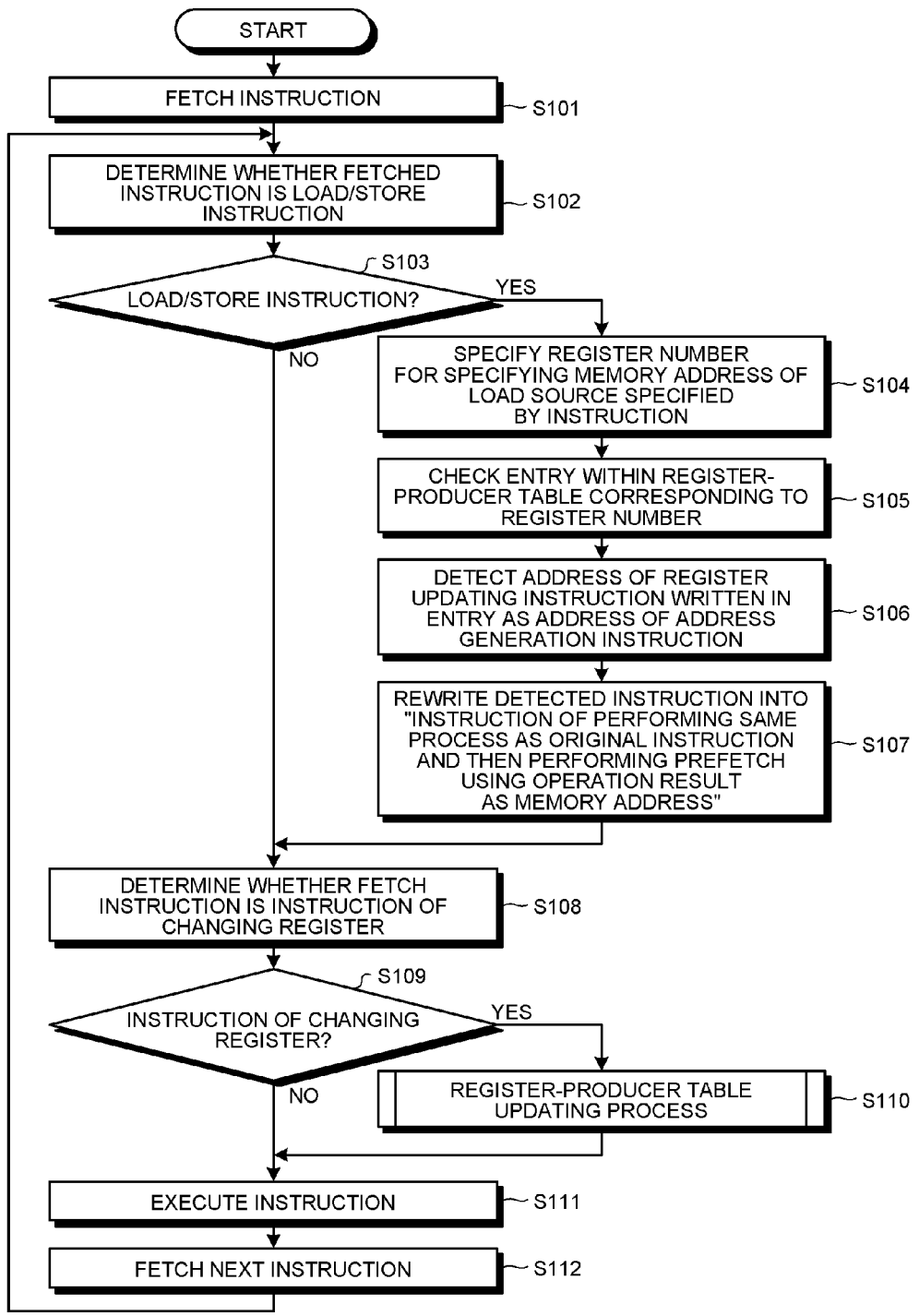
FIG. 7 is a flowchart illustrating a processing procedure of the processor according to the first embodiment.

Next, a processing procedure of the processor 100 according to the first embodiment is explained. FIG. 7 is a flowchart illustrating a processing procedure of the processor according to the first embodiment. As illustrated in FIG. 7, the processor 100 fetches an instruction (Step S101) and determines whether or not the fetched instruction is a load/store instruction (or memory access instruction) (Step S102).

When the fetched instruction is a load/store instruction (or memory access instruction) (Step S103: Yes), the processor 100 specifies a register number of specifying a memory address of a load source specified by the instruction (Step S104), and checks an entry within the register-producer table corresponding to the register number (Step S105).

Then, the processor 100 detects the address of the register updating instruction written in the entry as the address of an address generation instruction (Step S106), rewrites the detected instruction to "an instruction of performing the same process as the original instruction and then performing prefetch using the operation result as a memory address" (Step S107), and moves the control to Step S108.

On the other hand, when the fetched instruction is not a load/store instruction (or memory access instruction) (Step S103: No), the processor 100 determines whether the fetched instruction is an instruction of changing a register (Step S108). When the fetched instruction is an instruction of changing a register (Step S109: Yes), the processor 100 performs a register-producer table updating process (Step S110), and moves the control to Step S111.

On the other hand, when the fetched instruction is not an instruction of changing a register (Step S109: No), the processor 100 executes the instruction (Step S111), reads the next instruction (Step S112), and moves the control to Step S102.

Figure 8:
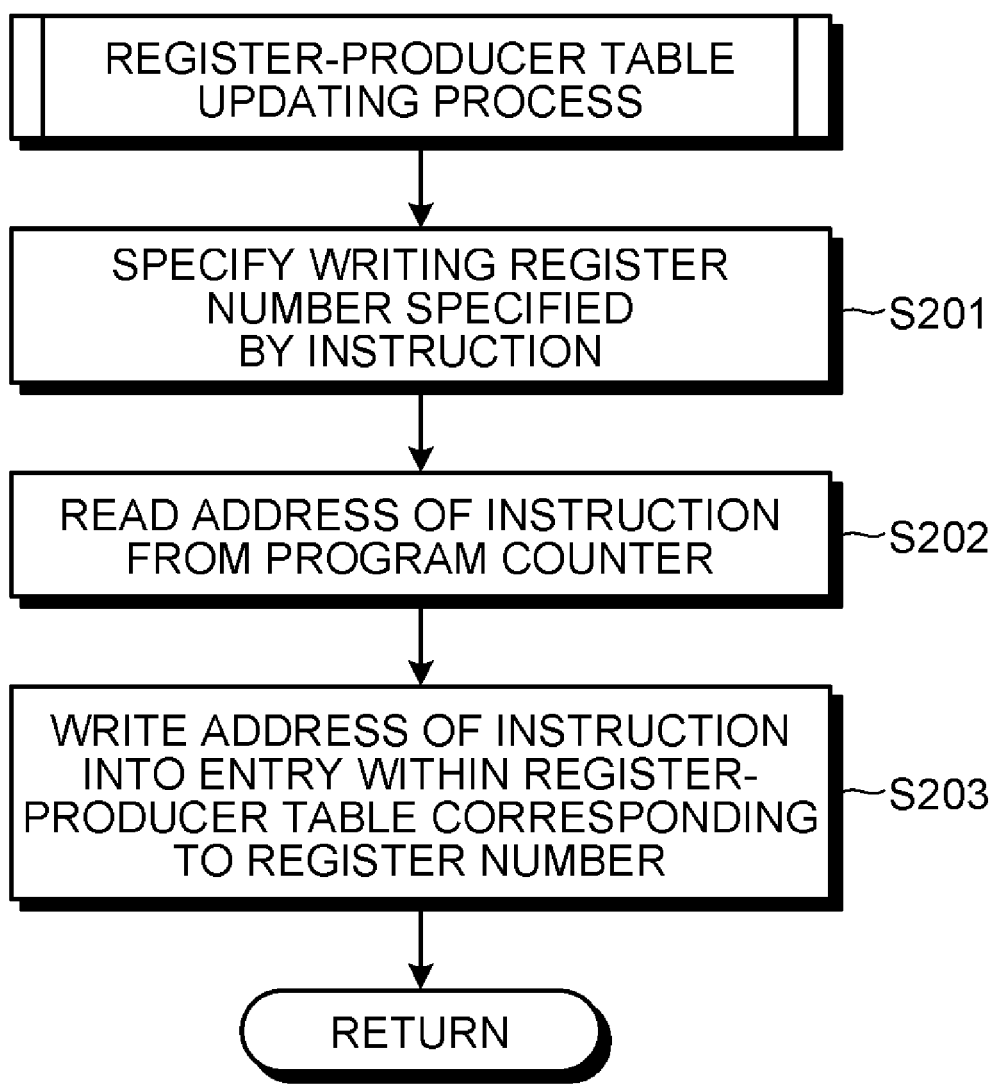
FIG. 8 is a flowchart illustrating a register-producer table updating process.

Next, the register-producer table updating process of Step S110 illustrated in FIG. 7 is explained. FIG. 8 is a flowchart illustrating the register-producer table updating process.

As illustrated in FIG. 8, the processor 100 specifies a writing register number specified by the instruction (register updating instruction) (Step S201), and reads the address of the instruction from the program counter (Step S202).

Then, the processor 100 writes the address of the instruction into an entry within the register-producer table corresponding to the register number (Step S203), and completes the register-producer table updating process.

As described above, the processor 100 according to the first embodiment loads a program from the main memory 300, detects a register updating instruction, registers the address of the register updating instruction in the register-producer table storing unit 150. Moreover, the processor 100 loads a program to detect a memory access instruction, compares a register number utilized by the detected memory access instruction with the register-producer table to specify an address generation instruction, and rewrites an instruction corresponding to the address generation instruction. Therefore, the processor 100 can perceive irregular memory access depicted in a general application and perform effective hardware prefetch.

[b] Second Embodiment

Next, a processor according to the second embodiment is explained. The processor according to the second embodiment specifies an address generation instruction by using a technique similar to that of the first embodiment. The processor according to the second embodiment maintains additional information on a cache to record the specified address generation instruction.

The mechanism of maintaining cache information is various. However, to simplify the explanation, it is assumed that the cache employs a direct mapping method. Even in a set associative method, it can be similarly realized by changing a part of retrieving the cache information to each method.

Cache information stored in the cache is explained. FIG. 9 is a diagram illustrating an example of a data structure of cache information. As illustrated in FIG. 9, the cache information includes a tag, a state, an address generation flag, and an instruction word.

Among these, the area of tag stores address information of determining whether a relevant line corresponds to a requested instruction. The state is information indicative of the state of the relevant line and indicates CLEAN, DIRTY, and INVALID.

The area of address generation flag stores information depicting whether the corresponding instruction word is an address generation instruction. The area of instruction word stores instructions for executing various types of processes. In an example illustrated in FIG. 9, it is assumed that each instruction word is associated with each address generation flag. An instruction word of which the address generation flag is "TRUE" becomes an address generation instruction.

Figure 10:
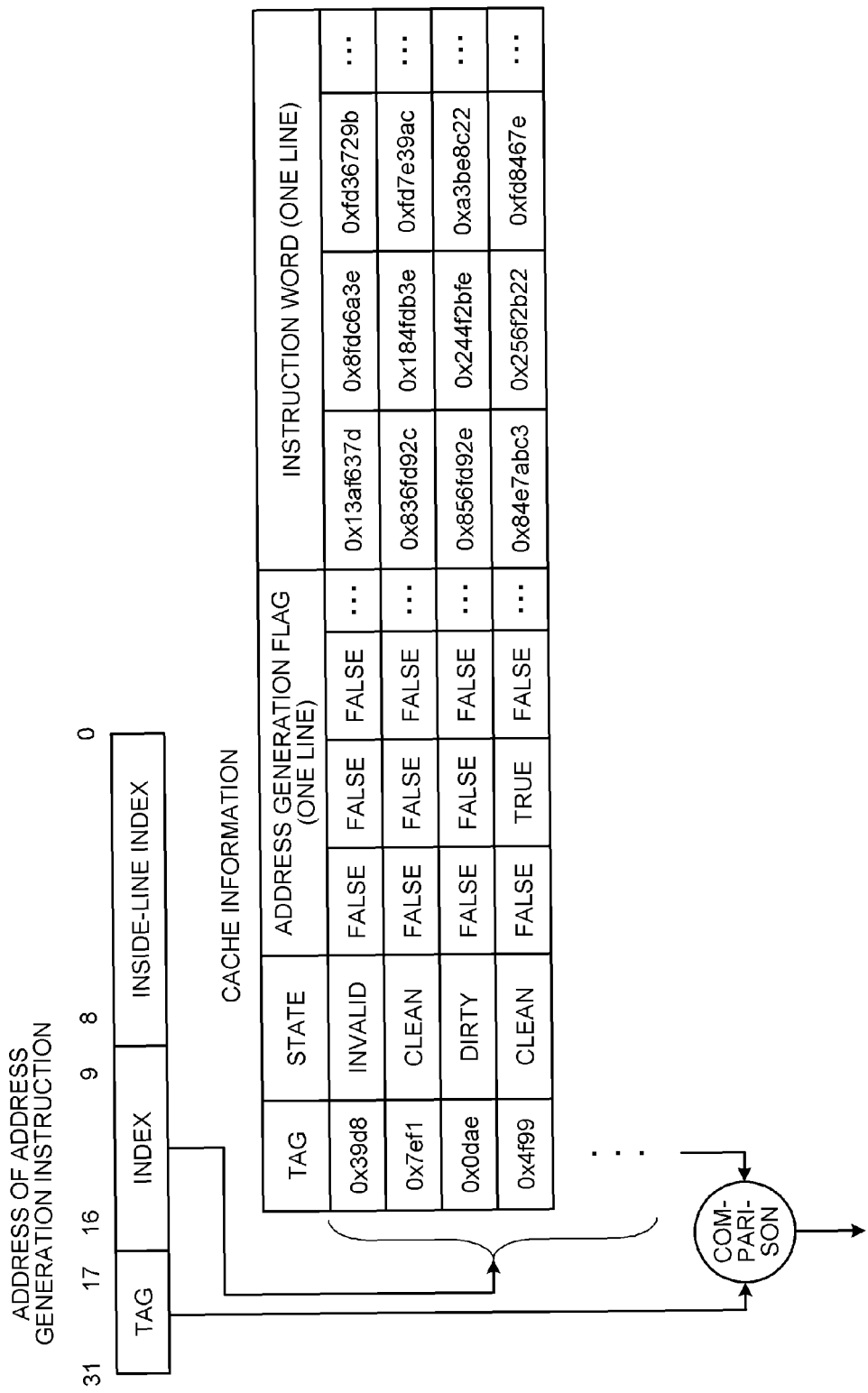
FIG. 10 is a diagram explaining a process by which the processor updates an address generation flag of cache information.

Next, a process by which the processor updates the address generation flag of cache information according to the second embodiment is explained. FIG. 10 is a diagram explaining a process by which the processor updates the address generation flag of cache information. In an example illustrated in FIG. 10, the address of an address generation instruction is divided into 15-bit, 8-bit, and 9-bit, which correspond respectively to tag, index, and inside-line index. However, the present invention is not limited to this. A dividing method is changed in accordance with the difference of cache scheme or the difference of line size.

The processor refers to the index of an address generation instruction and accesses the cache line corresponding to the index. Then, the processor compares the value of the tag of cache information stored in the cache line and the tag of the address generation instruction to determine whether they are identical to each other, and determines that a line including the relevant address is present on the cache when they are identical to each other.

After that, the processor converts the address generation flag of the relevant line from "FALSE" into "TRUE" based on the value stored in the inside-line index of the address of the address generation instruction. For example, when the address generation flag of cache information (address generation flag located at the fourth-stage from the top and the second-line from left of cache information) is converted into "TRUE" based on the address of the address generation instruction illustrated in FIG. 10, the second-line instruction word from left of the instruction word corresponds to an address generation instruction.

Figure 11:
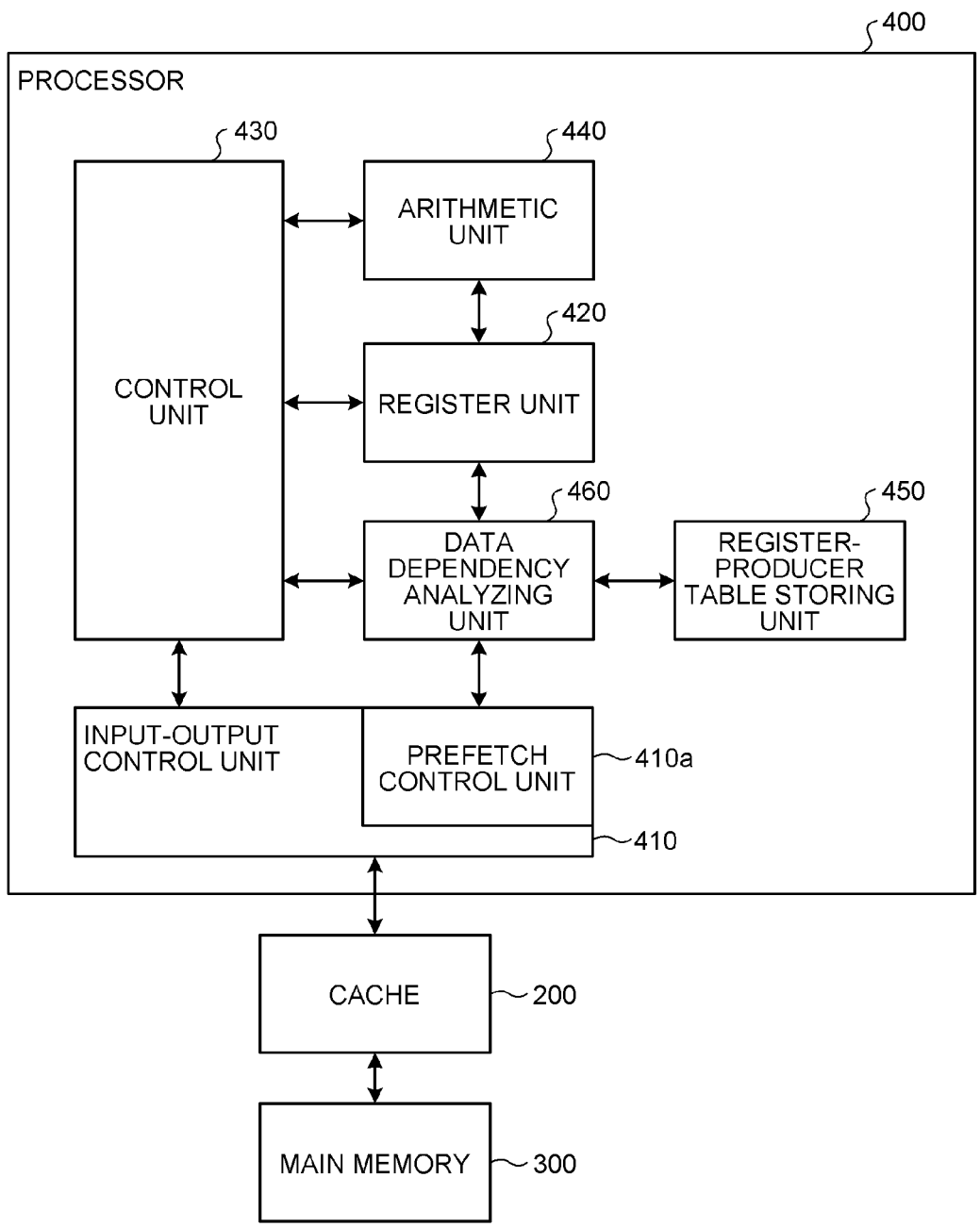
FIG. 11 is a functional block diagram illustrating the configuration of a processor according to a second embodiment.

Next, an example of the configuration of the processor described above is explained. FIG. 11 is a functional block diagram illustrating the configuration of the processor according to the second embodiment. As illustrated in FIG. 11, a processor 400 includes an I/O control unit 410, a register unit 420, a control unit 430, an arithmetic unit 440, a register-producer table storing unit 450, and a data dependency analyzing unit 460.

Among these, because the descriptions related to the I/O control unit 410, the register unit 420, the control unit 430, the arithmetic unit 440, and the register-producer table storing unit 450 are similar to the descriptions related to the I/O control unit 110, the register unit 120, the control unit 130, the arithmetic unit 140, and the register-producer table storing unit 150 illustrated in FIG. 6, their descriptions are omitted.

The data dependency analyzing unit 460 is a unit for specifying an address generation instruction and converting the address generation flag of cache information stored in the cache 200 based on the address of the specified address generation instruction. Specifically, the data dependency analyzing unit 460 loads a program stored in the main memory 300 or the cache 200, specifies a register updating instruction, and registers the address of the specified register updating instruction in the register-producer table.

Moreover, the data dependency analyzing unit 460 analyzes the dependency relation of the program, specifies an address generation instruction based on the technique depicted in the first embodiment (see FIG. 4), and updates the address generation flag of cache information of the cache 200 (see FIG. 10). When the cache information stored in the cache 200 is read and an instruction is executed, the data dependency analyzing unit 460 compares the address generation flag and the instruction word.

When the address generation instruction is an instruction that becomes "TRUE", the address generation instruction is determined as an address generation instruction, and a control instruction is output to a prefetch control unit 410a to prefetch the value of the register updated by the address generation instruction (the address of data to be prefetched is output to the prefetch control unit 410a).

Figure 12:
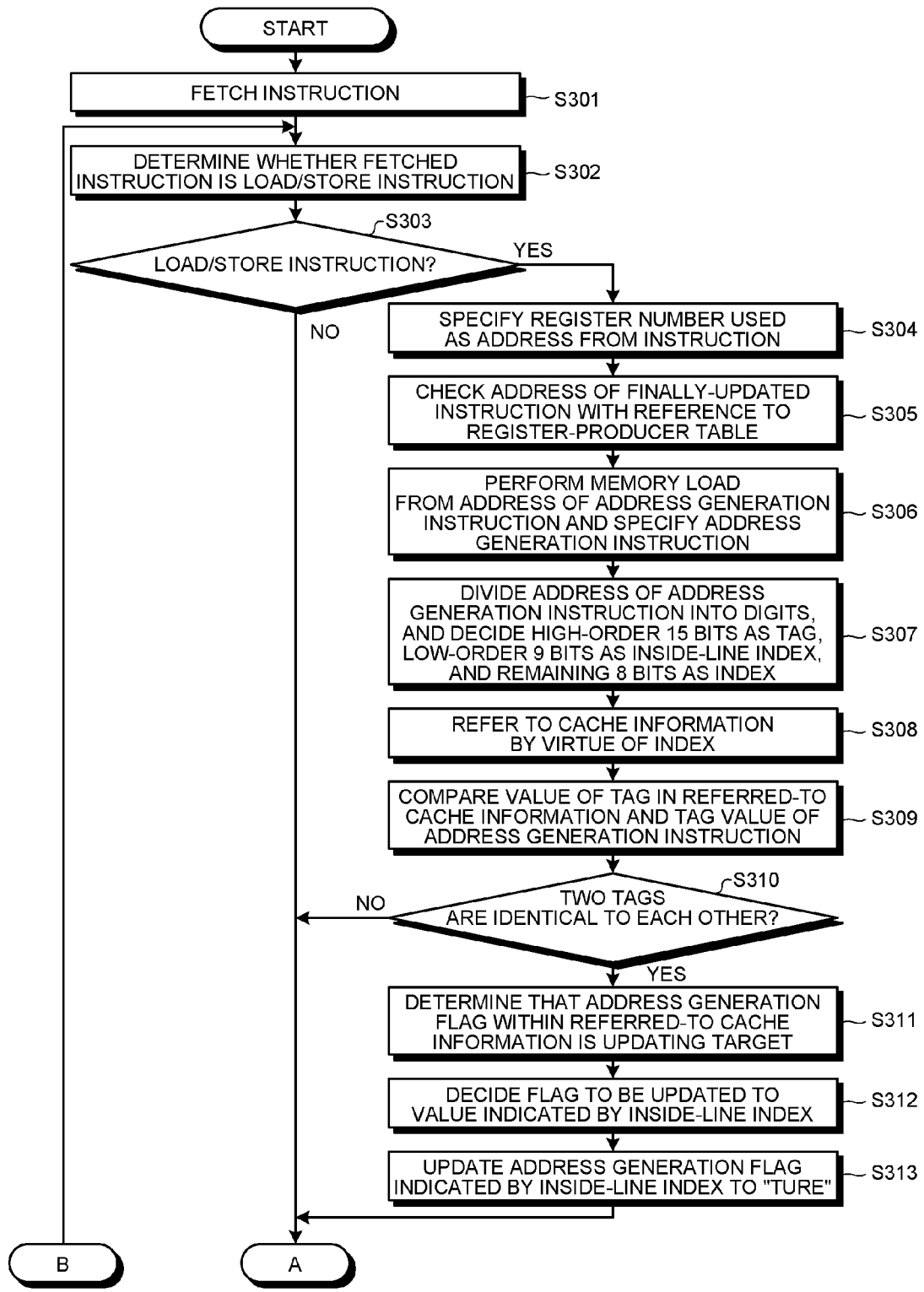
FIG. 12 is a flowchart (1) illustrating a processing procedure of the processor according to the second embodiment.
Figure 13:
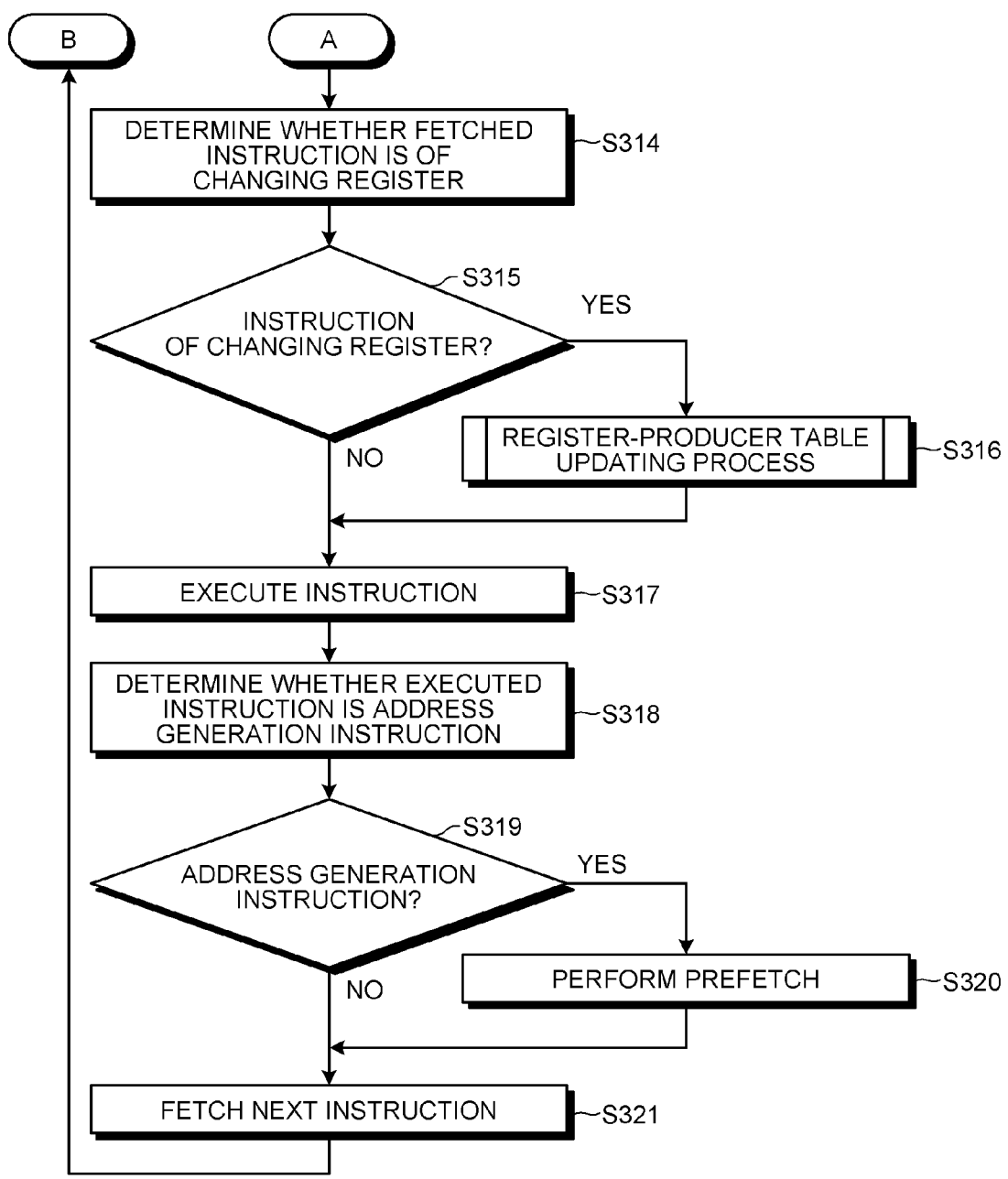
FIG. 13 is a flowchart (2) illustrating a processing procedure of the processor according to the second embodiment.

Next, the processing procedure of the processor 400 according to the second embodiment is explained. FIGS. 12 and 13 are flowcharts illustrating the processing procedure of the processor 400 according to the second embodiment. As illustrated in FIGS. 12 and 13, the processor 400 fetches an instruction (Step S301), and determines whether or not the fetched instruction is a load/store instruction (or memory access instruction) (Step S302).

When the fetched instruction is a load/store instruction (or memory access instruction) (Step S303: Yes), the processor 400 specifies a register number used as an address from the instruction (Step S304), refers to the register-producer table, and checks the address of a finally-updated instruction (address generation instruction) (Step S305).

Then, the processor 400 performs memory reading from the address of an address generation instruction, specifies an address generation instruction (Step S306), and divides the address of the address generation instruction into digits. In this case, it is assumed that high-order 15-bit is a tag, low-order 9-bit is an inside-line index, and remaining 8-bit is an index (Step S307).

The processor 400 refers to cache information by virtue of the index of the address generation instruction (Step S308), and compares the value of the tag in the referred-to cache information and the tag value of the address generation instruction (Step S309). When the two tags are not identical to each other (Step S310: No), the control moves to Step S314.

On the other hand, when the two tags are identical to each other (Step S310: Yes), the processor 400 determines that the address generation flag within the referred-to cache information is an updating target (Step S311), decides a flag to be updated to a value indicated by the inside-line index (Step S312), updates an address generation flag indicated by the inside-line index to "TRUE" (Step S313), and moves the control to Step S314.

When the fetched instruction is not a load/store instruction (or memory access instruction) (Step S303: No), the processor 400 determines whether the fetched instruction is an instruction of changing a register (Step S314). When the fetched instruction is an instruction of changing a register (Step S315: Yes), the processor 400 executes a register-producer table updating process (Step S316) and moves the control to Step S317.

On the other hand, when the fetched instruction is not an instruction of changing a register (Step S315: No), the processor 400 executes the instruction (Step S317), and determines whether the executed instruction is an address generation instruction (Step S318). When the executed instruction is an address generation instruction (Step S319: Yes), the processor 400 executes prefetch (Step S320), and moves the control to Step S321.

On the other hand, when the executed instruction is not an address generation instruction (Step S319: No), the processor 400 fetches the next instruction (Step S321) and moves the control to Step S302. In addition, because the register-producer table updating process of Step S316 illustrated in of FIG. 13 corresponds to the process described in FIG. 8, its description is omitted.

As described above, the processor 400 according to the second embodiment loads a program from the main memory 300, detects a register updating instruction, registers the address of the register updating instruction in the register-producer table storing unit 450. Moreover, the processor 400 loads the program to detect a memory access instruction, compares the register number utilized by the detected memory access instruction and the register-producer table to specify an address generation instruction, and converts the address generation flag of the cache 200. Therefore, the processor can perceive irregular memory access depicted in a general application and perform effective hardware prefetch by utilizing the address generation flag at the time of instruction execution.

[c] Third Embodiment

Next, a processor according to the third embodiment is explained. The processor according to the third embodiment specifies an address generation instruction by using the technique similar to that of the first embodiment. Then, the processor according to the third embodiment registers the address of the specified address generation instruction in an address generation instruction table.

Figures 14, 15:
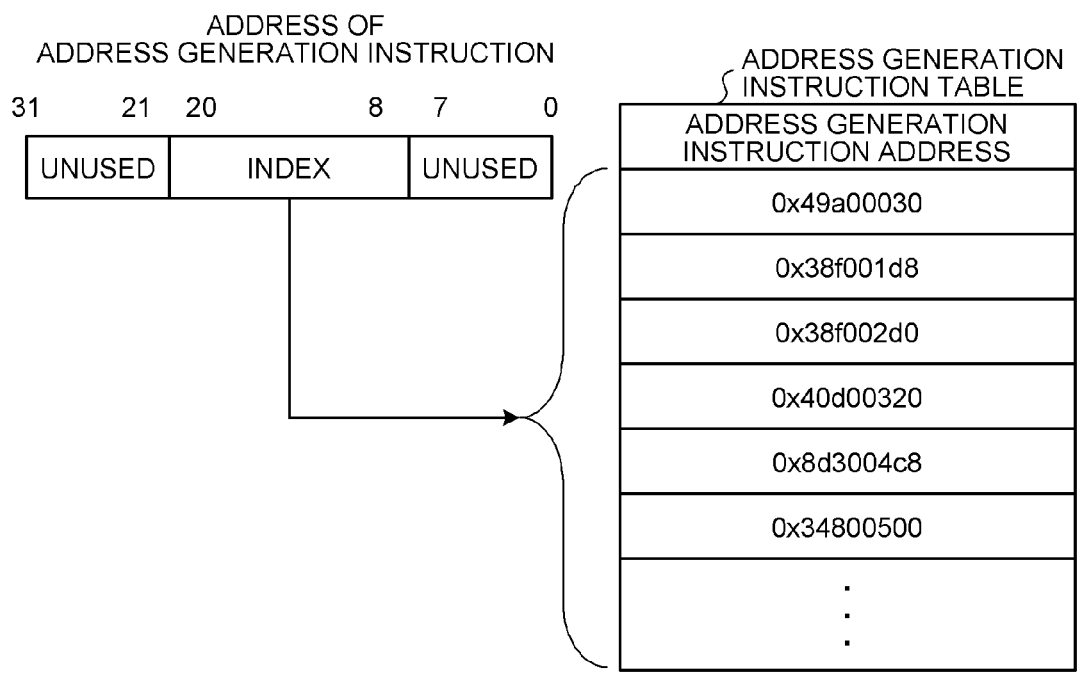
FIG. 14 is a diagram illustrating an example of a data structure of an address generation instruction table.
FIG. 15 is a diagram explaining a method by which the processor refers to an address generation table.

FIG. 14 is a diagram illustrating an example of a data structure of the address generation instruction table. As illustrated in FIG. 14, the address generation instruction table stores the addresses of address generation instructions. The configuration method of the address generation instruction table includes a direct method, a set associative method, a full associative method, and the like similarly to the cache. However, the third embodiment employs a direct method as an example.

Next, a method by which the processor refers to the address generation table according to the third embodiment is explained. FIG. 15 is a diagram explaining the method by which the processor refers to the address generation table. As illustrated in FIG. 15, the processor interprets a part of an address generation instruction as an index and refers to the address generation instruction table by using the index. When registering the address of the address generation instruction, the entry of the address generation instruction table indicated by such an index is overwritten on the address to be registered.

When an instruction is determined as an address generation instruction, the processor specifies the address of a surveyed instruction, and refers to the address generation table by using an index obtained from the address. If the written address is identical with the address of the surveyed instruction, the relevant instruction can be determined as an address generation instruction.

Figure 16:
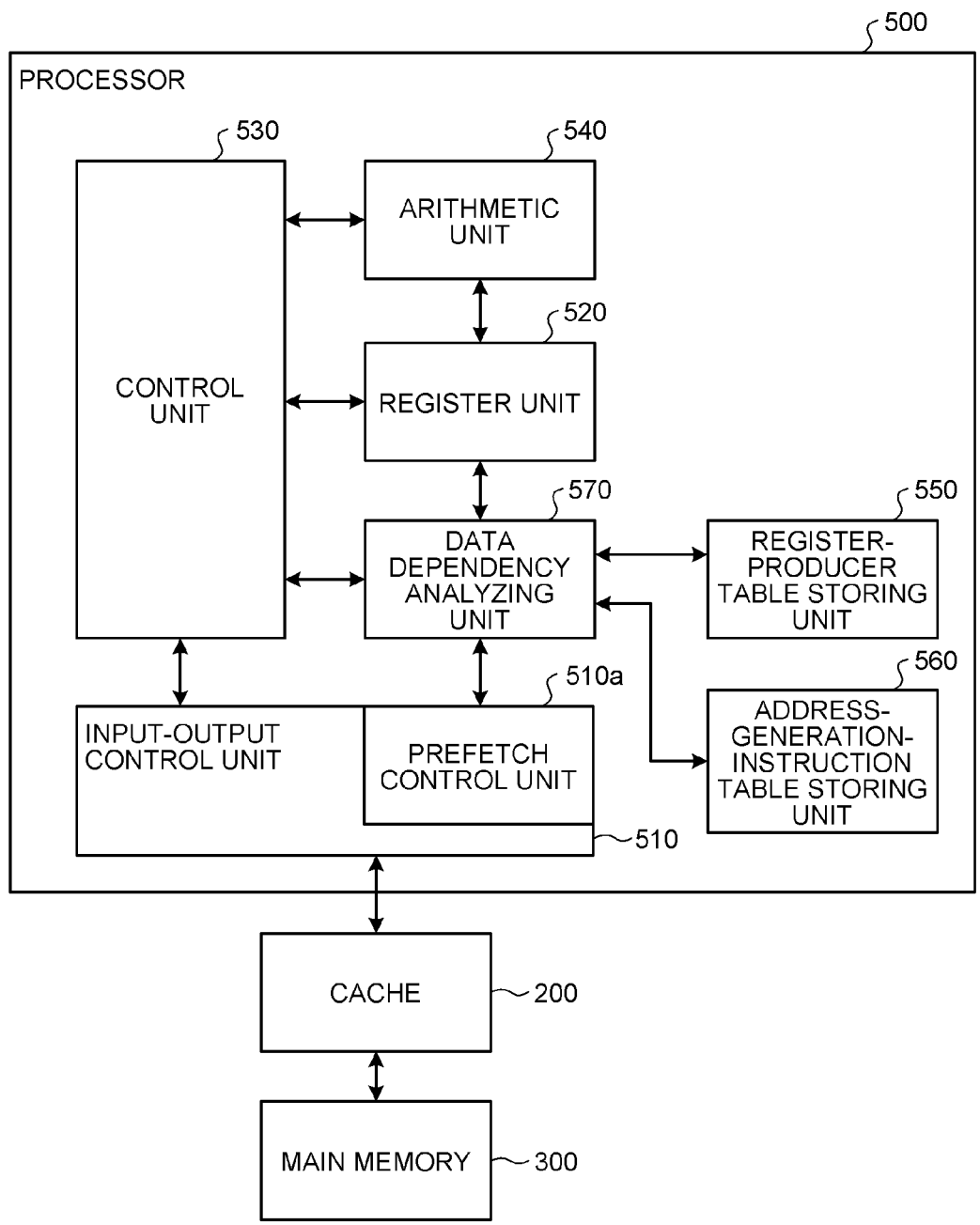
FIG. 16 is a functional block diagram illustrating the configuration of a processor according to a third embodiment.

Next, an example of the configuration of the processor described above is explained. FIG. 16 is a functional block diagram illustrating the configuration of the processor according to the third embodiment. As illustrated in FIG. 16, a processor 500 includes an I/O control unit 510, a register unit 520, a control unit 530, an arithmetic unit 540, a register-producer table storing unit 550, an address-generation-instruction table storing unit 560, and a data dependency analyzing unit 570.

Among these, because the descriptions related to the I/O control unit 510, the register unit 520, the control unit 530, the arithmetic unit 540, and the register-producer table storing unit 550 are similar to the descriptions related to the I/O control unit 110, the register unit 120, the control unit 130, the arithmetic unit 140, and the register-producer table storing unit 150 illustrated in FIG. 6, their descriptions are omitted.

The address-generation-instruction table storing unit 560 is a storage unit for storing the address generation instruction table illustrated in FIG. 14.

The data dependency analyzing unit 570 is a unit for specifying an address generation instruction and storing the address of the specified address generation instruction in the address generation instruction table. Specifically, the data dependency analyzing unit 570 loads a program stored in the main memory 300 or the cache 200, specifies a register updating instruction, and registers the address of the specified register updating instruction in the register-producer table.

The data dependency analyzing unit 570 analyzes the dependency relation of the program, specifies an address generation instruction by using the technique depicted in the first embodiment (see FIG. 4), and registers the address of the address generation instruction in the address generation instruction table stored in the address-generation-instruction table storing unit 560 (see FIG. 14). When the data dependency analyzing unit 570 loads the program and executes an instruction, the data dependency analyzing unit 570 compares the address of the instruction with the address generation instruction table.

When an index included in the address of the instruction is present in the address generation instruction table, the data dependency analyzing unit 570 determines that this instruction is an address generation instruction and outputs a control instruction to a prefetch control unit 510a to prefetch the value of the register updated by the address generation instruction (outputs the address of data to be prefetched to the prefetch control unit 510a).

Figure 17:
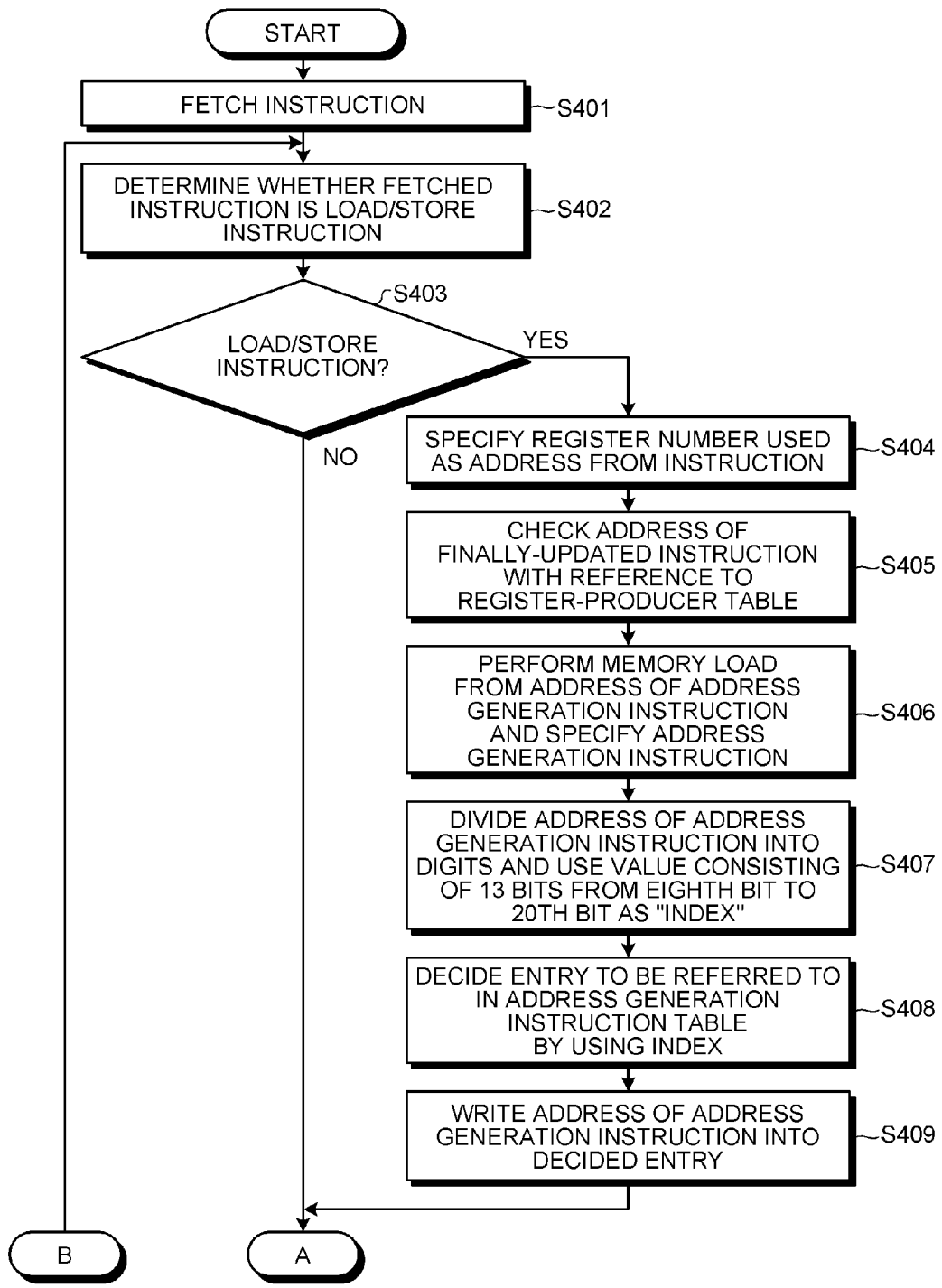
FIG. 17 is a flowchart (1) illustrating a processing procedure of the processor according to the third embodiment.
Figure 18:
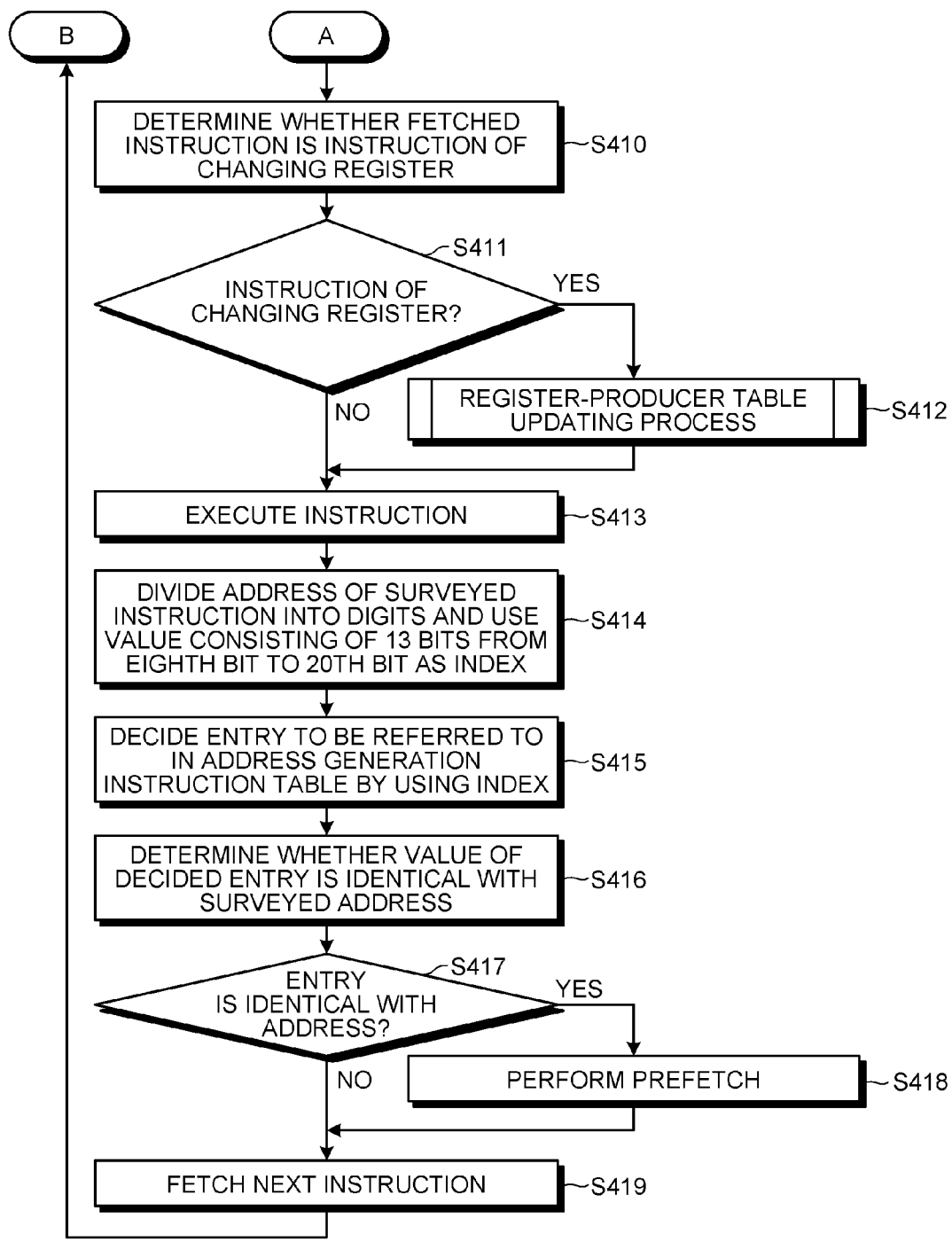
FIG. 18 is a flowchart (2) illustrating a processing procedure of the processor according to the third embodiment.

Next, the processing procedure of the processor 500 according to the third embodiment is explained. FIGS. 17 and 18 are flowcharts illustrating the processing procedure of the processor 500 according to the third embodiment. As illustrated in FIGS. 17 and 18, the processor 500 fetches an instruction (Step S401) and determines whether or not the fetched instruction is a load/store instruction (or memory access instruction) (Step S402).

When the fetched instruction is a load/store instruction (or memory access instruction) (Step S403: Yes), the processor 500 specifies a register number to be used as an address from the instruction (Step S404), refers to the register-producer table, and checks the address of a finally-updated instruction (Step S405).

Then, the processor 500 performs memory load from the address of an address generation instruction, specifies an address generation instruction (Step S406), divides the address of the address generation instruction into digits, and uses a value consisting of 13 bits from an eighth bit to a 20th bit as an "index" (Step S407).

The processor 500 decides an entry to be referred to in the address generation instruction table by using the index (Step S408), writes the address of the address generation instruction into the decided entry (Step S409), and moves the control to Step S410.

When the fetched instruction is not a load/store instruction (or memory access instruction) (Step S403: No), the processor 500 determines whether the fetched instruction is an instruction of changing a register (Step S410). When the fetched instruction is an instruction of changing a register (Step S411: Yes), the processor 500 performs a register-producer table updating process (Step S412) and moves the control to Step S413.

On the other hand, when the fetched instruction is not an instruction of changing a register (Step S411: No), the processor 500 executes the instruction (Step S413), divides the address of a surveyed instruction into digits, and uses a value consisting of 13 bits from an eighth bit to a 20th bit as an index (Step S414).

Next, the processor 500 decides an entry to be referred to in the address generation instruction table by using the index (Step S415) and determines whether the value of the decided entry is identical with a surveyed address (Step S416).

When the entry is identical to the address (Step S417: Yes), the processor 500 performs prefetch (Step S418) and moves the control to Step S419. On the other hand, when the entry is not identical to the address (Step S417: No), the processor 500 fetches the next instruction (Step S419) and moves the control to Step S402. Because the register-producer table updating process of Step S412 illustrated in FIG. 18 corresponds to the process described in FIG. 8, its description is omitted.

As described above, the processor 500 according to the third embodiment loads a program from the main memory 300, detects a register updating instruction, and registers the address of the register updating instruction in the register-producer table storing unit 550. Moreover, the processor 500 loads the program to detect a memory access instruction, compares a register number utilized by the detected memory access instruction with the register-producer table to specify an address generation instruction, and registers the address of the address generation instruction in the address generation instruction table. Therefore, the processor 500 can perceive irregular memory access depicted in a general application and perform effective hardware prefetch by utilizing the address generation instruction table at the time of instruction execution.

[d] Fourth Embodiment

The examples of the present invention have been explained so far. However, the present invention can be realized in accordance with various different configurations in addition to the first to third embodiments. Therefore, another embodiment of the present invention is explained as the fourth embodiment.

(1) Compiler Optimization focused on Address Generation Instruction

When a compiler compiles a source program, because the compiler analyzes a dependency relation between instructions and detects address generation instructions, it is possible to generate an application program that can realize high-speed memory access. A technique of detecting address generation instructions can utilize the same technique as that described in the first to third embodiments.

When the address generation instruction is detected, the compiler performs optimization such as preferentially arranging an instruction of calculating the input data of the address generation instruction in an application program or embedding an instruction of prefetching the data updated by the address generation instruction just after the address generation instruction. Therefore, it is possible to generate an application that can perform efficient prefetch.

The application program generated by such a compiler starts, when memory access occurs, the prior read of data at the time at which the memory address is decided. Moreover, because a process required for memory address decision rearranges instructions to be preferentially processed if possible, the prior read operation can start as soon as possible. In this way, the application program generated by the compiler can prefetch data at the optimum time and thus realize high-speed data reading.

(2) Implementation on Virtual Machine

It is assumed to consider a virtual machine hosted on a processor having a cache organization. The virtual machine detects an address generation instruction by using the same technique as that described in the first to third embodiments. The virtual machine detects an address generation instruction from a binary that operates on the virtual machine and performs prefetch of data corresponding to memory access to the virtual machine on a memory system of an actual machine.

The virtual machine performs a data flow analysis on a program that is being executed by the virtual machine and realizes automatic prefetch similarly to the system of the first to third embodiments. Therefore, the program that is being executed by the virtual machine also has optimized memory access and can operate at high speed. In addition, the program executed by the virtual machine is stored in, for example, a main memory and is loaded and executed by a processor.

(3) Implementation on Just In Time Compilation Environment

It is assumed to consider a virtual machine hosted on a processor having a cache organization. The virtual machine has a Just In Time compilation function. Similarly to the virtual machine described above, the virtual machine detects an address generation instruction by using the same technique as that of the first to third embodiments.

The virtual machine adds an instruction of performing prefetch on an address indicated by an operation result to just after the address generation instruction during Just In Time compilation. When a prefetch instruction after conversion does not effectively function, the prefetch instruction should be deleted from an instruction sequence that is again converted. In this way, the virtual machine can realize high-speed memory access and instruction execution.

(4) Configuration of System

Among the processes described in the embodiments of the present invention, the whole or a part of processes that have been automatically performed can be manually performed. Alternatively, the whole or a part of processes that have been manually performed can be automatically performed in a well-known method. Also, processing procedures, control procedures, concrete titles, and information including various types of data and parameters, which are described in the document and the drawings, can be arbitrarily changed except that they are specially mentioned.

Each component of the processors 100, 400, and 500 illustrated in the drawings indicates a function of a process to be performed by the processors. Therefore, these components are not necessarily constituted physically as illustrated in the drawings. In other words, the specific configuration of dispersion/integration of each device is not limited to the illustrated configuration. Therefore, all or a part of each device can dispersed or integrated functionally or physically in an optional unit in accordance with various types of loads or operating conditions. Furthermore, all or a part of each process function performed by each device can be realized by a CPU and a program (for example, a virtual machine) that is analyzed and executed by the CPU.

Various types of processing procedures explained in the embodiments of the present invention can be realized by executing a program prepared beforehand with a computer. The program can be distributed via a network such as Internet. Moreover, the program can be recorded in a recording medium, which can be read by the computer, such as a hard disk, a flexible disk (FD), a CD-ROM, an MO, or a DVD and can be executed by being read from the recording medium by the computer.

According to an embodiment, when a program stored in a memory is loaded to execute an instruction and the instruction is determines as an instruction for updating a value of a register, identification information of the register and the instruction are stored in association with each other in a register-producer table. When the program stored in the memory is loaded to execute an instruction and the instruction is determined as an instruction accessing an address indirectly specified by a register, an instruction of updating the register is specified as an address generation instruction based on identification information of the register indirectly specifying the address and the register-producer table, and a value of the register updated by the address generation instruction is prefetched. Therefore, it is possible to perceive irregular memory access depicted in a general application and perform effective hardware prefetch.

Moreover, according to an embodiment, because an instruction corresponding to the address generation instruction among instructions included in the program is rewritten into an instruction of executing prefetch considering that the same process as the original instruction is performed and then an operation result is used as a memory address and the prefetch is performed based on the rewritten instruction, high-speed memory access can be realized.

Moreover, according to an embodiment, because additional information of the effect that an instruction is an address generation instruction is added to an instruction corresponding to the address generation instruction among instructions stored in the cache and a value of the register updated by the instruction to which the additional information is added is prefetched, high-speed memory access can be realized.

Moreover, according to an embodiment, because when an instruction specified as the address generation instruction is registered in the address generation table and the instruction registered in the address generation table is executed, a value of the register updated by the instruction is prefetched, high-speed memory access can be realized.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A processor having a prefetch function for previously storing information of a memory storage in a cache, the processor comprising:
    a storage control unit that stores, when a program stored in the memory storage is loaded to execute an instruction and it is determined that the instruction is an instruction for updating a value of a register, identification information of the register and the instruction in association with each other in a register-producer table;
    an instruction specifying unit that specifies, when the program stored in the memory storage is loaded to execute an instruction and it is determined that the instruction is an instruction accessing an address indirectly specified by a register, an instruction of updating the register as an address generation instruction based on identification information of the register indirectly specifying the address and the register-producer table; and
    a prefetch unit that prefetches a value of the register updated by the address generation instruction.

2. The processor according to claim 1, wherein
    the instruction specifying unit rewrites an instruction corresponding to the address generation instruction among instructions included in the program into an instruction of performing a same process as an original instruction and then performing prefetch using an operation result as a memory address, and
    the prefetch unit performs the prefetch based on the rewritten instruction.

3. The processor according to claim 1, wherein
    the instruction specifying unit adds additional information indicating that an instruction corresponding to the address generation instruction, among instructions stored in the cache, is an address generation instruction to the instruction, and
    the prefetch unit prefetches a value of the register updated by the instruction to which the additional information is added.

4. The processor according to claim 1, wherein
    the instruction specifying unit registers an instruction specified as the address generation instruction in an address generation table, and
    the prefetch unit prefetches, when executing the instruction registered in the address generation table, a value of the register updated by the instruction.

5. A computer readable storage medium having stored a program therein, the program causing a computer to execute a process comprising:
    storing, when a program stored in a memory storage is read to execute an instruction and it is determined that the instruction is an instruction for updating a value of a register, identification information of the register and the instruction in association with each other in a register-producer table;
    specifying, when the program stored in the memory storage is read to execute an instruction and it is determined that the instruction is an instruction accessing an address indirectly designated by a register, an instruction of updating the register as an address generation instruction based on identification information of the register indirectly designating the address and the register-producer table; and
    prefetching a value of the register updated by the address generation instruction.

6. The computer readable storage medium according to claim 5, wherein
    the specifying includes rewriting an instruction corresponding to the address generation instruction among instructions included in the program into an instruction of performing a same process as an original instruction and then performing prefetch using an operation result as a memory address, and
    the prefetching includes performing the prefetch based on the rewritten instruction.

7. The computer readable storage medium according to claim 5, wherein
    the computer includes a cache that stores prefetched information,
    the specifying includes adding additional information indicating that an instruction corresponding to the address generation instruction, among instructions stored in the cache, is an address generation instruction to the instruction, and
    the prefetching includes prefetching a value of the register updated by the instruction to which the additional information is added.

8. The computer readable storage medium according to claim 5, wherein
    the specifying includes registering an instruction specified as the address generation instruction in an address generation table, and
    the prefetch step includes prefetching, when executing the instruction registered in the address generation table, a value of the register updated by the instruction.

* * * * *